United States Patent [19]

Huang

[11] Patent Number: 5,240,265
[45] Date of Patent: Aug. 31, 1993

[54] JOINT FOR MOUNTING A BACKREST SUPPORT ON A STROLLER FRAME

[76] Inventor: Ming-Tai Huang, 4th Fl., No. 302, Pai Ling Wu Rd., Taipei, Taiwan

[21] Appl. No.: 965,360

[22] Filed: Oct. 23, 1992

[51] Int. Cl.⁵ .............................................. B62B 9/12
[52] U.S. Cl. ..................................... 280/47.4; 280/642; 280/650; 280/658; 297/354.12; 403/93; 403/116
[58] Field of Search ............... 280/642, 644, 650, 658, 280/47.38, 47.4; 297/353, 355; 403/93, 116, 117

[56] References Cited

U.S. PATENT DOCUMENTS

| | | | |
|---|---|---|---|
| 3,397,912 | 8/1968 | Bush | 297/355 |
| 3,695,685 | 10/1972 | Lamb | 297/355 X |
| 4,386,805 | 6/1983 | Boisset | 297/355 X |
| 4,477,199 | 10/1984 | Manzoni | 403/93 |
| 4,620,813 | 11/1986 | Lacher | 403/93 |
| 4,639,012 | 1/1987 | Jensen | 280/47.4 X |
| 4,836,573 | 6/1989 | Gebhard | 280/644 |
| 5,039,118 | 8/1991 | Huang | 280/642 X |
| 5,069,474 | 12/1991 | Tai | 297/355 X |

FOREIGN PATENT DOCUMENTS

| | | | |
|---|---|---|---|
| 2346073 | 4/1974 | Fed. Rep. of Germany | 297/355 |
| 2454190 | 5/1975 | Fed. Rep. of Germany | 297/355 |
| 597810 | 9/1959 | Italy | 297/355 |
| 677374 | 11/1964 | Italy | 297/355 |
| 793890 | 4/1958 | United Kingdom | 297/355 |
| 2076047 | 11/1981 | United Kingdom | 297/355 |

Primary Examiner—Brian Johnson
Attorney, Agent, or Firm—Poms, Smith, Lande & Rose

[57] ABSTRACT

A joint for adjustably mounting a backrest support on a stroller frame. The joint consists of a first element and a second element. The first element has (a) an arc-shaped edge, (b) a hole formed transversely through the first element, (c) two bosses formed on a side of the first element, for which the hole is the middle point, (d) a flange formed along the arc-shaped edge, (e) a number of teeth formed on the flange and (f) a pocket for receiving the backrest support. The second element has (a) a tubular body for receiving a handle, (b) a clamp formed below the tubular body, for receiving a rear wheel leg, (c) a plate with an arc-shaped rim, being formed on a side of the tubular body, (d) a passage formed transversely through the plate and the tubular body, (e) two slots formed in the plate and (f) a number of recesses formed in the arc-shaped rim. A rivet penetrates a hole in a seat support, the hole in the first element, the passage in the second element and a hole in the handle. The teeth are received in corresponding recesses, for retaining the backrest support in a desired position. The bosses are received in the slots, for restraining rotation of the first element with respect to the second element within a certain degree.

2 Claims, 5 Drawing Sheets 5,240,265

JOINT FOR MOUNTING A BACKREST SUPPORT ON A STROLLER FRAME

BACKGROUND OF THE INVENTION

1. Field of the Invention

The present invention relates to a toy stroller and, more particularly, to a joint for adjustably mounting a backrest support to a stroller frame.

2. Related Prior Art

Referring to FIG. 7, a conventional joint has a first element 6 having a circular cavity 61 surrounded by a wall formed with a plurality of identical teeth 62, a central hole 63, and a sleeve 64 for receiving a segment (not shown) of a stroller frame. Each tooth 62 is tapered at an outer end thereof. A second element 7 has a cup-shaped portion integrated with a sleeve 75 for receiving a backrest support (not shown). The cup-shaped portion defines a cavity 74 and a bottom. A circular boss 71 is formed at an external face of the bottom of the cup-shaped portion, and is surrounded by a plurality of identical teeth 72 corresponding to the teeth 62. A hole 73 extends centrally through the boss 71. A helical spring 80 is received in the cavity 74. A cover 81 having a central hole is received in the cavity 74 so as to compress the spring 80. A rivet 82 is inserted through the hole of the cover 81, the spring 80, and holes 73 and 63, thereby combining the joint and connecting the backrest support to the stroller frame. Because of the wedge-like contact between the outer ends of the teeth 62 and the teeth 72, the teeth 72 can be disengaged from the teeth 62 when subject to a torque, thereby allowing the second element 7 to be rotated. The helical spring 80 urges the teeth 72 to engage with the teeth 62 again, when the first and second elements 6 and 7 are released from the torque. Such joint is structurally complicated. Therefore, the present invention is intended to obviate or mitigate the abovementioned problem.

SUMMARY OF THE INVENTION

It is an object of the present invention to provide a joint having a first element, a second element and a device for retaining the first element at a desired position with respect to the second element.

It is another object of the present invention to provide a joint having a first element, a second element and a device for restraining rotation of the first element of said second element within a certain degree.

For a better understanding of the present invention and objects thereof, a study of the detailed description of the embodiments described hereinafter should be made in relation to the accompanying drawings.

DETAILED DESCRIPTION OF THE PREFERRED EMBODIMENT

Figure 1:
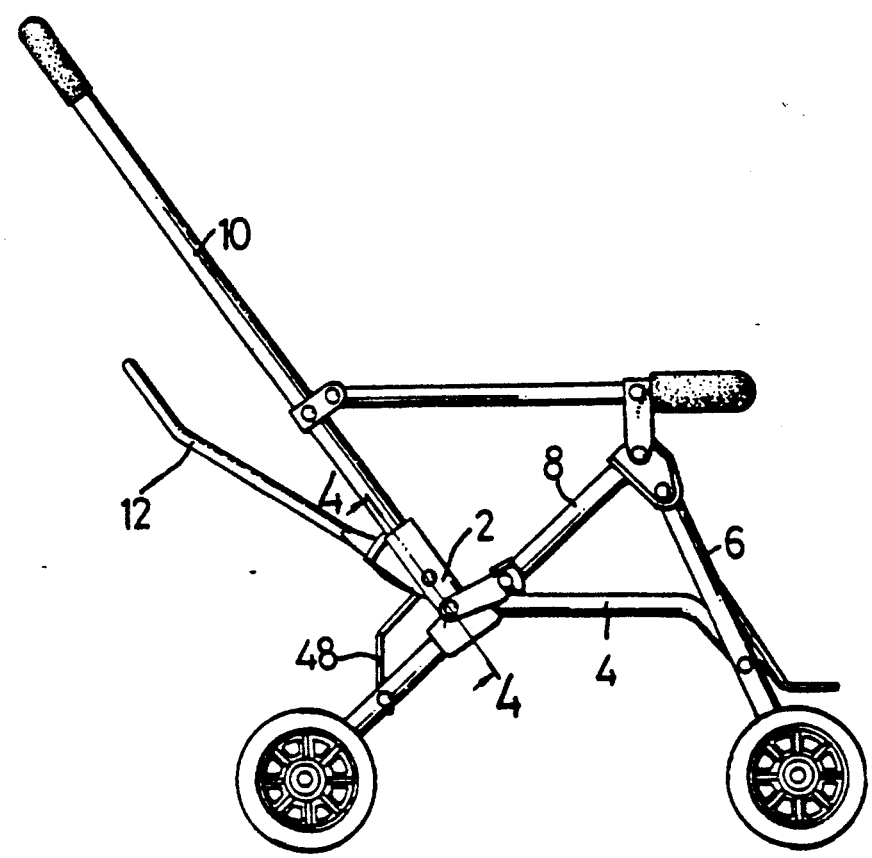
FIG. 1 is a left side view of a stroller frame in accordance with the present invention.

Referring to the drawings and, more particularly, to FIG. 1, a toy stroller employs two joints 2 (only one is shown) in accordance with the preferred embodiment of the present invention. The toy stroller has two seat supports 4, two front wheel legs 6, two rear wheel legs 8, two handles 10 and two backrest supports 12. However, only one seat support 4, one front wheel leg 6, one rear wheel leg 8, one handle 10 and one backrest support 12 are visible as the toy stroller is shown in a side view.

Figure 2:
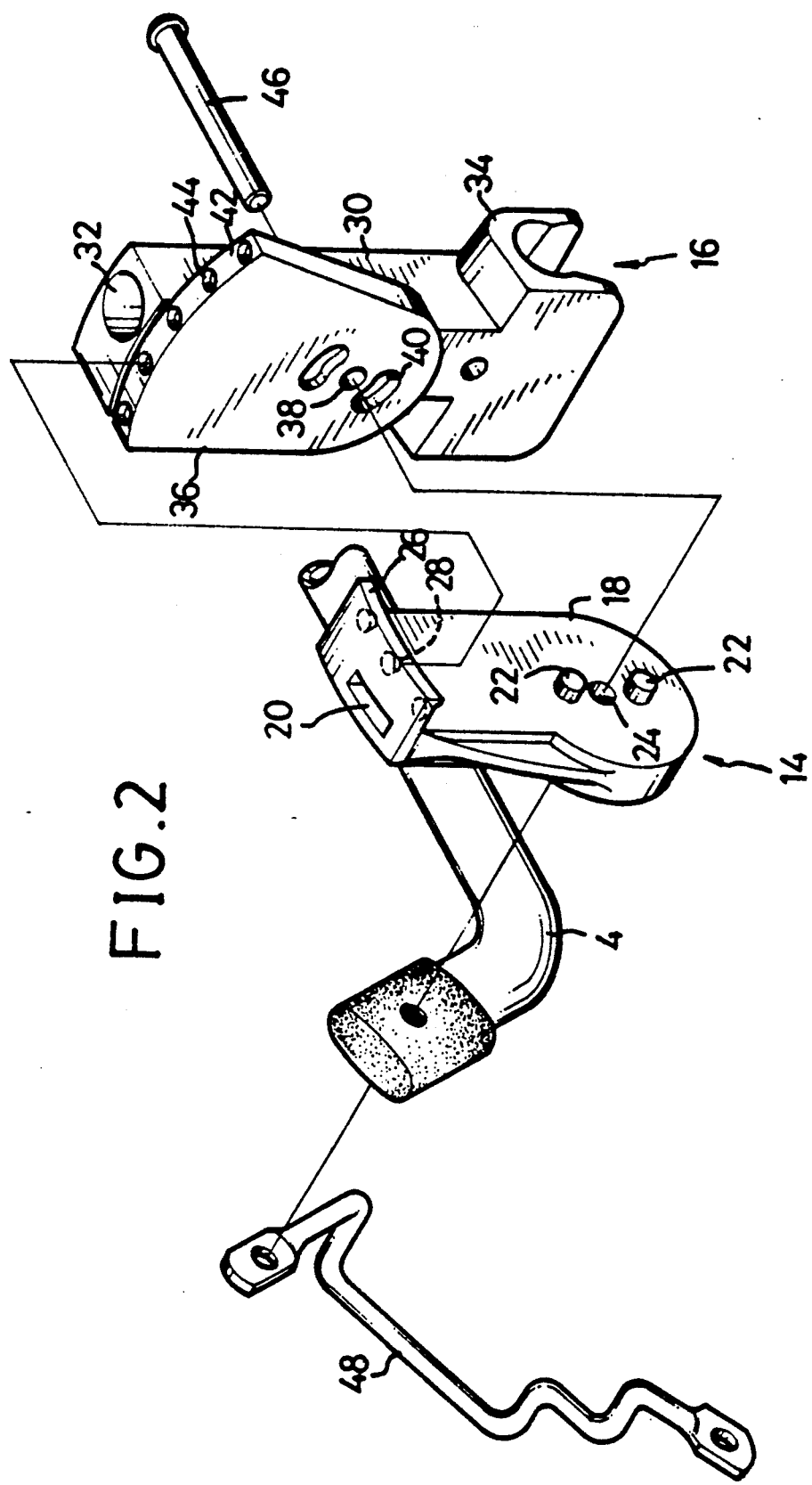
FIG. 2 is an exploded view of a joint for mounting a backrest support on a stroller frame in accordance with the present invention, wherein a backrest support receiving section is shown in a top rear left view.

Referring to FIG. 2, one joint 2 has a first element 14 which is shown in a top back left view and a second element 16 which is biased along a vertical axis for 90° from its working position relative to the first element 14.

The first element 14 has a plate-shaped body 18. The body 18 has a first surface and a second surface. A pocket 20 is formed in the body 18 between the first and second surfaces for receiving a corresponding backrest support 12. Two bosses 22 protrude from the second surface. A hole 24 is formed through the body 18 at a middle point between the bosses 22. Near the entrance of the pocket 20, a flange 26 is formed on the second surface along an arc for which the hole 24 is a center. A plurality of teeth 28 are formed on the flange 26, facing the hole 24.

The second element 16 has a body 30. A recess 32 is longitudinally formed in the body 30 through a first end of the body 30, for receiving the handle 10. A clamp 34 is transversely formed on the second end of the body 30, for receiving the rear wheel leg 8. A plate-shaped portion 36 is integrally formed on a side of the body 30. A passage 38 is formed transversely through the body 30 and the plate-shaped portion 36. Two arc-shaped slots 40 extend along arcs of a circle being co-axial with the passage 38. The plate-shaped portion 36 has a rim 42 extending along an arc for which the passage 38 is the center. A plurality of recesses 44 are formed in the rim 42.

Figure 3:
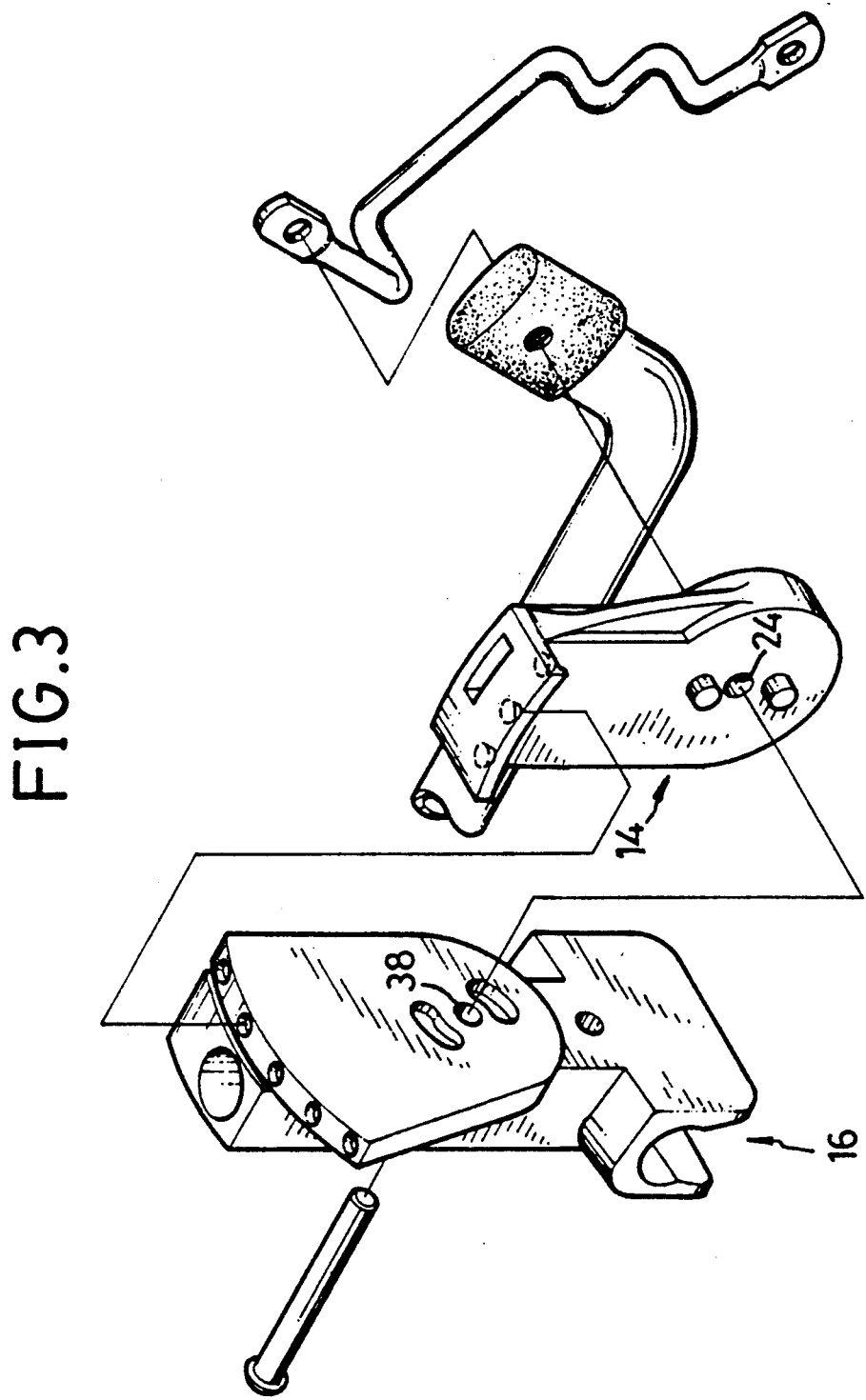
FIG. 3 is an exploded view of another joint for mounting a backrest support on a stroller frame in accordance with the present invention, wherein a section which is securely attached on the stroller frame is shown in a top rear left view.

Referring to FIG. 3, the other joint 2 is symmetrical to the joint 2 shown in FIG. 2. The second element 16 is shown in a top rear left view and the first element 14 is biased along a vertical axis for 90° from its working position relative to the second element 16.

The hole 24 is aligned with the passage 38 when the bosses 22 are each slidably received in a corresponding one of the slots 40, for insertion of a rivet 46. A distance between two adjacent teeth 28 is identical to a distance between two adjacent recesses 44, so that the teeth 28 can be received in corresponding recesses 44.

Figure 4:
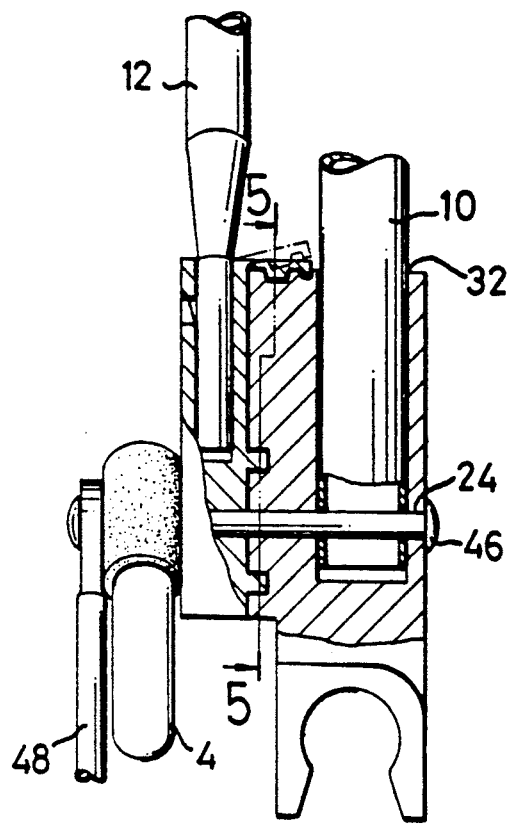
FIG. 4 is a partial cross-sectional view of a joint for mounting a backrest support on a stroller frame in accordance with the present invention, taken along a line 4—4 of FIG. 1.

Referring to FIG. 4, the handle 10 is received in the recesses 32. The rivet 46 is inserted through the passage 38, a passage in the handle 10, the hole 24, a passage in the seat support 4 and a hole in an element 48. Thus, the joint is assembled. The backrest support 12 is received in the pocket 20.

Figure 5:
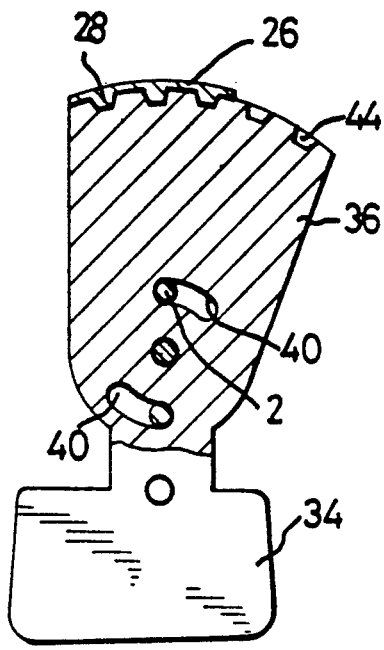
FIG. 5 is a partial cross-sectional view, taken along a line 5—5 in FIG. 4, of a joint for mounting a backrest support on a stroller frame in accordance with the present invention, showing a first element in a first position with respect to a second position.
Figure 6:
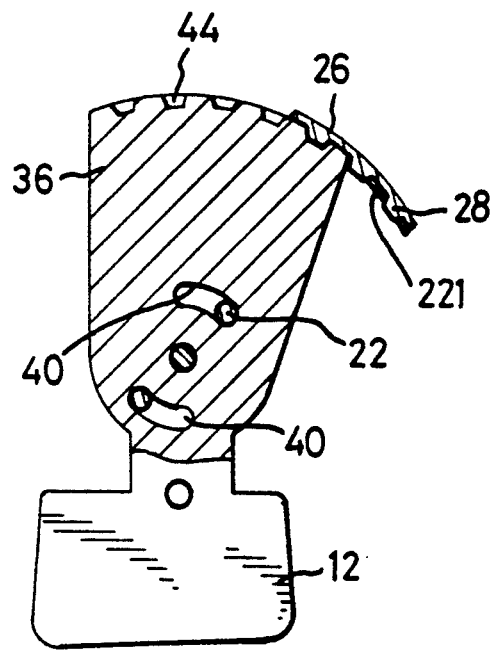
FIG. 6 is a view similar to FIG. 5, but showing the first element in a second position with respect to the second element.
Figure 7:
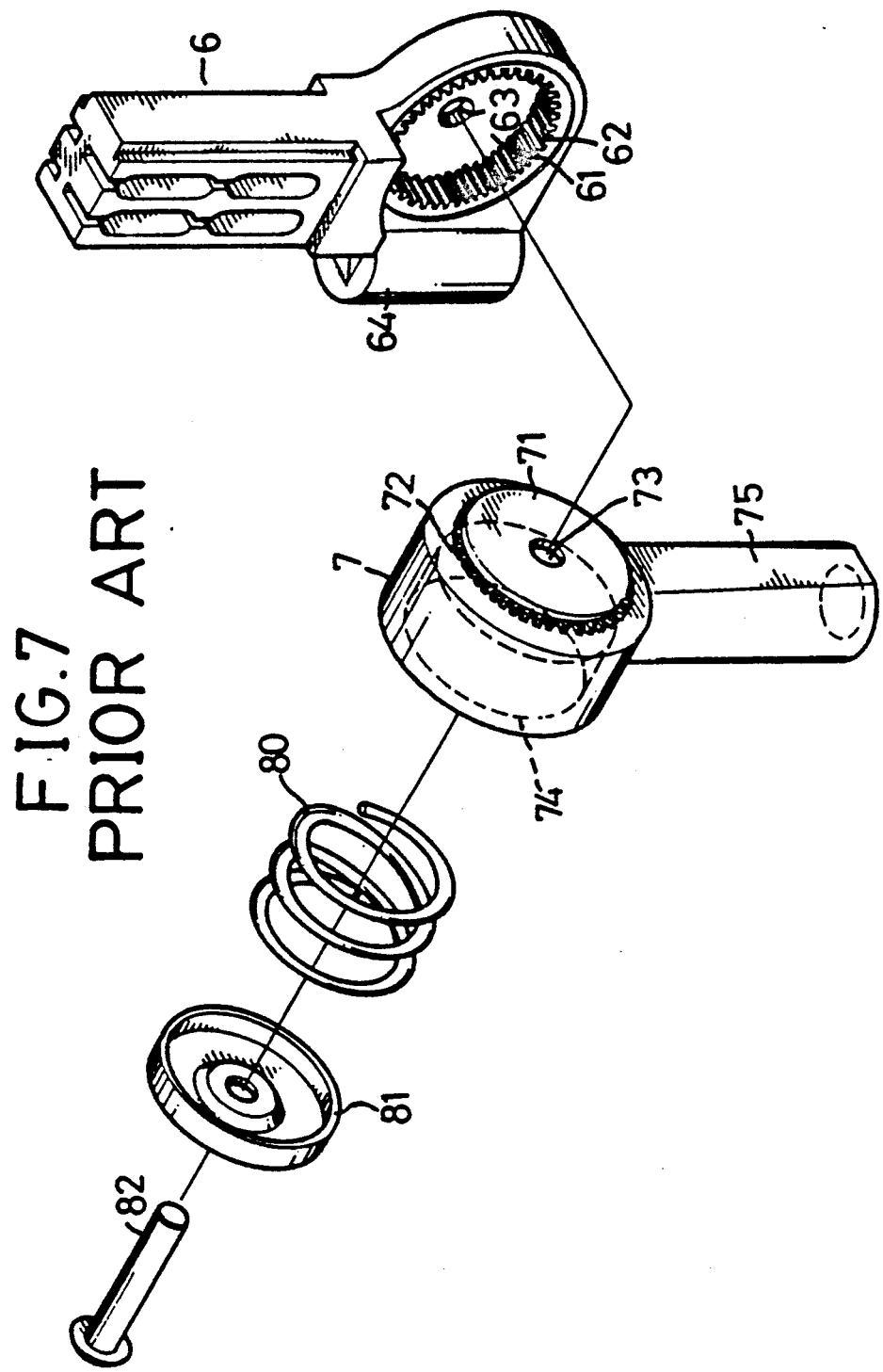
FIG. 7 is a perspective view of a joint for mounting a backrest support on a stroller frame in accordance with prior art.

Referring to FIG. 5, the bosses 22 are slidably received in the slots 40 and the teeth 28 are received in corresponding recesses 44, so that the first element 14 is retained in a first position relative to the second element 16. Accordingly, the backrest support 12 is retained in a first position relative to the handle 10. The bosses 28 have a tapered form corresponding to that of the recess 44. That is, the teeth 28 and recesses 44 each have an inclined periphery. Thus, the inclined peripheries of the teeth 28 are apt to slide on the inclined peripheries of the recesses 44 when subjected to a torque for rotating the first element 14 relative to the second element 16. Made with the appropriate material, the flange 26 is flexible (see FIG. 4) so that the teeth 28 are allowed to disengage from the recesses 44. That is, the first element 14 is allowed to pivot to a second position with respect to the second element 16 (see FIG. 6). Accordingly, the backrest support 12 is moved to a second position relative to the handle 10. The first element 14 will not be further moved relative to the second element 16 along the same direction, as the bosses 22 are restrained by the slots 40.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A joint for mounting a backrest support on a stroller frame, comprising:
    a first element having (a) an arc-shaped edge, (b) a hole formed therethrough and (c) a pocket formed therein for receiving the backrest support;
    a second element having (a) a tubular body for receiving a handle, (b) a clamp formed below said tubular body for receiving a rear wheel leg, (c) a plate with an arc-shaped edge attached to said tubular body, and (d) a passage formed transversely through said plate and said tubular body;
    a rivet penetrating (a) a hole in a seat support, (b) said hole through said first element, (c) said passage through said second element, and (d) a hole through the handle, for assembling said joint; and
    one of said first and second elements having (a) a flange formed along a respective arc-shaped edge and (b) a number of teeth formed on said flange, and the remaining of said first and second elements having a number of recesses formed in the respective arc-shaped edge for receiving said teeth for retaining said first element at a desired position relative to said second element.

2. A joint in accordance with claim 1, wherein one of said first and second elements has at least one boss, and the remaining of said first and second elements has at least one arc-shaped slot for receiving said at least one boss, for restraining rotation of said first element relative to said second element within a certain degree.

* * * * *

UNITED STATES PATENT AND TRADEMARK OFFICE
CERTIFICATE OF CORRECTION

PATENT NO. : 5,240,265
DATED : Aug. 31, 1993
INVENTOR(S) : Sean P. O'Connor

It is certified that error appears in the above-indentified patent and that said Letters Patent is hereby corrected as shown below:

Column 6, claim 9, line 65, should read --mixture further contains a lubricat---.

Signed and Sealed this

Second Day of August, 1994

*Attest:*

BRUCE LEHMAN

*Attesting Officer*   *Commissioner of Patents and Trademarks*